United States Patent [19]
Gonzalez

[11] Patent Number: 5,909,926
[45] Date of Patent: Jun. 8, 1999

[54] VEHICLE SEATING ASSEMBLY

[75] Inventor: Jose Gonzalez, Cerritos, Calif.

[73] Assignee: Hi-Tech Seating Products, Inc., South Gate, Calif.

[21] Appl. No.: 08/707,795

[22] Filed: Sep. 4, 1996

[51] Int. Cl.[6] .................................................. B60N 2/02
[52] U.S. Cl. .............................. 297/354.12; 297/344.21; 297/452.18; 297/301.4
[58] Field of Search ........................ 297/452.18, 452.2, 297/474, 475, 285, 291, 301.4, 344.21, 344.22, 344.26, 311, 344.1, 344.11, 354.12

[56] References Cited

U.S. PATENT DOCUMENTS

| | | | |
|---|---|---|---|
| 2,901,026 | 8/1959 | Thaden | 297/301.4 X |
| 3,926,396 | 12/1975 | Hall et al. | 297/344.22 X |
| 4,120,531 | 10/1978 | Fetterman | 297/344.22 |
| 4,682,561 | 7/1987 | Jentry | 297/344.21 X |
| 5,131,721 | 7/1992 | Okamoto | 297/452.18 |
| 5,318,341 | 6/1994 | Griswold et al. | 297/452.18 X |
| 5,380,064 | 1/1995 | Yamano et al. | 297/344.22 |
| 5,501,509 | 3/1996 | Urrutia | 297/452.18 |
| 5,564,785 | 10/1996 | Schultz et al. | 297/452.2 |

FOREIGN PATENT DOCUMENTS

| | | | |
|---|---|---|---|
| 7205237 | 12/1982 | Japan | 297/344.21 |
| 8071227 | 4/1983 | Japan | 297/344.21 |
| 3038044 | 2/1988 | Japan | 297/344.21 |

*Primary Examiner*—Laurie K. Cranmer
*Attorney, Agent, or Firm*—Baker & Daniels

[57] ABSTRACT

A vehicle seating assembly includes a seat frame member supporting a back frame member. The back frame member includes a channel section which resists deformation of the back frame member. The seat frame member is also connected to the channel member through a pivot connection. A seat belt retractor is mounted adjacent the seat frame member and in back of the lower portion of the back frame member, but is supported on a support assembly which is attached directly to the supporting pedestal so that the seat belt forces transmitted through the retractor are taken through either the back or the seat frame members. A pivot connection is provided between the pedestal and the support assembly, which is releasable to permit a rotation of the seat and back frame members relative to the pedestal.

9 Claims, 6 Drawing Sheets

VEHICLE SEATING ASSEMBLY

This invention relates to a vehicle seating assembly of the type particularly useful on recreational vehicles, such as converted vans, light trucks, motor homes, heavy trucks, transit busses, etc.

Seating assemblies for vehicles such as converted vans, motor homes, and other types of vehicles are commonly installed by the vehicle converter or motor home manufacturer. Such seating must meet all federal requirements, including occupant protection requirements during vehicle crashes, and must be easily installable in the vehicle. Vehicle seating of this type includes a rigid frame upon which padding and upholstery are installed. The seating includes a frame for both the seat and back. These frame members must be rigid, and it is also desirable that they be relatively small and light in weight. It is also desirable, for ease of installation, that the frame include a mount for the required seat belt and seat belt retractor; however, it is desirable that the retractor be mounted so that forces may be taken directly into the mounting pedestal and not through the frame, and that the seat back be permitted to pivot with respect to the seat. Finally, it is also desirable that the seat include a pivot attachment to permit pivoting of the seat relative to the pedestal.

According to the present invention, a portion of one side of the tubular back frame member is replaced with a channel section having a pair of side flanges and a web interconnecting the side flanges. The ends of the tubular portion of the frame member are attached, as by welding, to the channel member, and an extension from the seat frame extends into the channel member and is attached thereto a pivot connection. The channel member rigidities the seat back frame and provides a three point attachment between the ends of the frame and the extension from the seat frame. The channel member also cooperates with a recliner spring assembly to provide a design triangle to distribute loads exerted on the seat back through an upper seat belt bracket across the three points of the triangle. The seat frame is mounted on a mounting pedestal through cross-frame member and rails between the cross-frame member. The seat belt retractor is attached to a gusset plate between the rails and the cross-frame member through a mounting bracket. Accordingly, force is transmitted through the seat belt retainer transmitted directly into the pedestal and not through the seat frame. A pivot connection is provided between the seat frame and the pedestal, but the connection does not permit the seat frame to be dislodged from the pedestal.

These and other features of the present invention will become apparent from the following description, with references to the accompanying drawings, in which.

Figure 1:
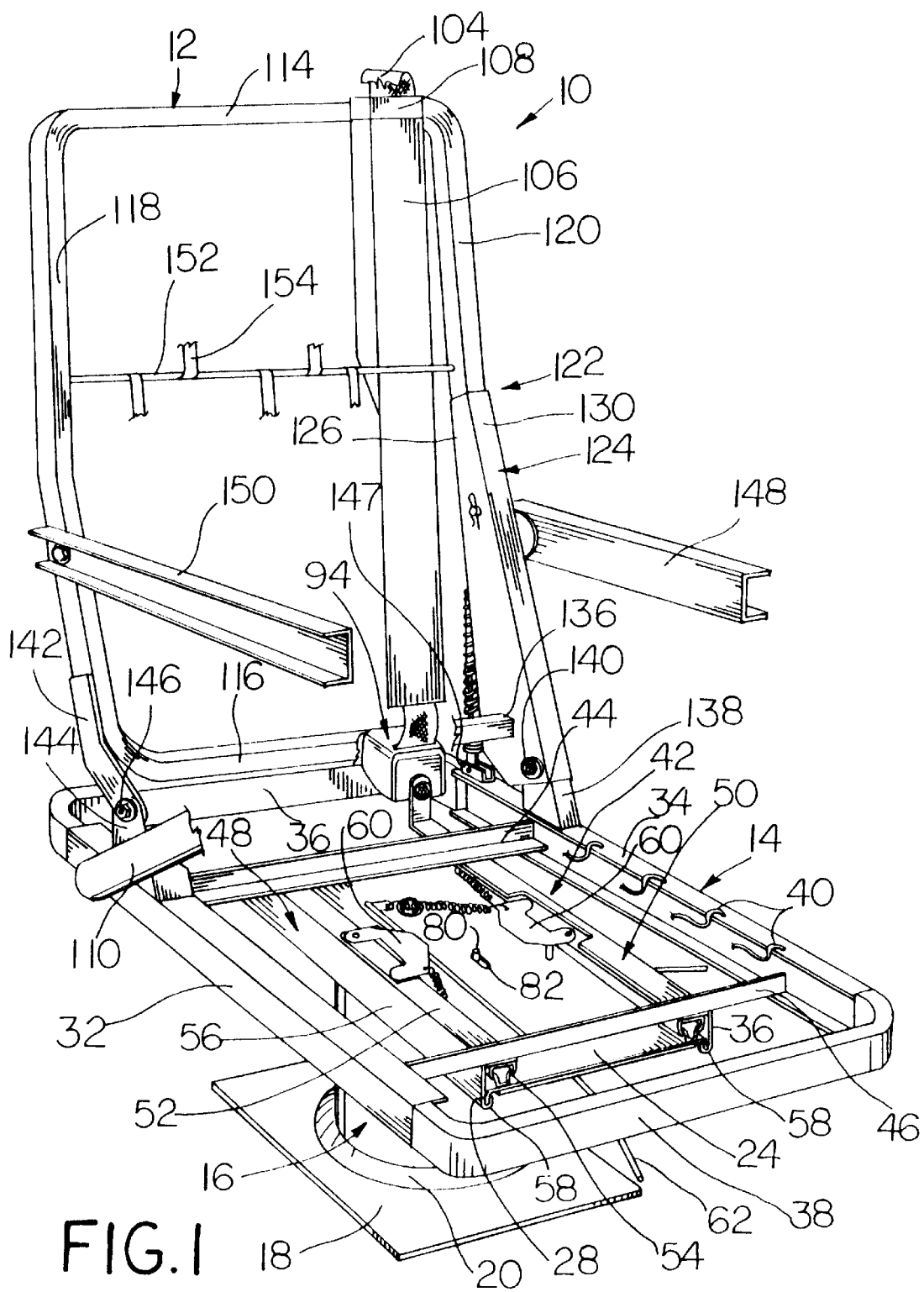
FIG. 1 is a view in perspective of a vehicle seating assembly made pursuant to the present invention, but with the padding and upholstery removed to show the unique features of the seat frame.
Figure 2:
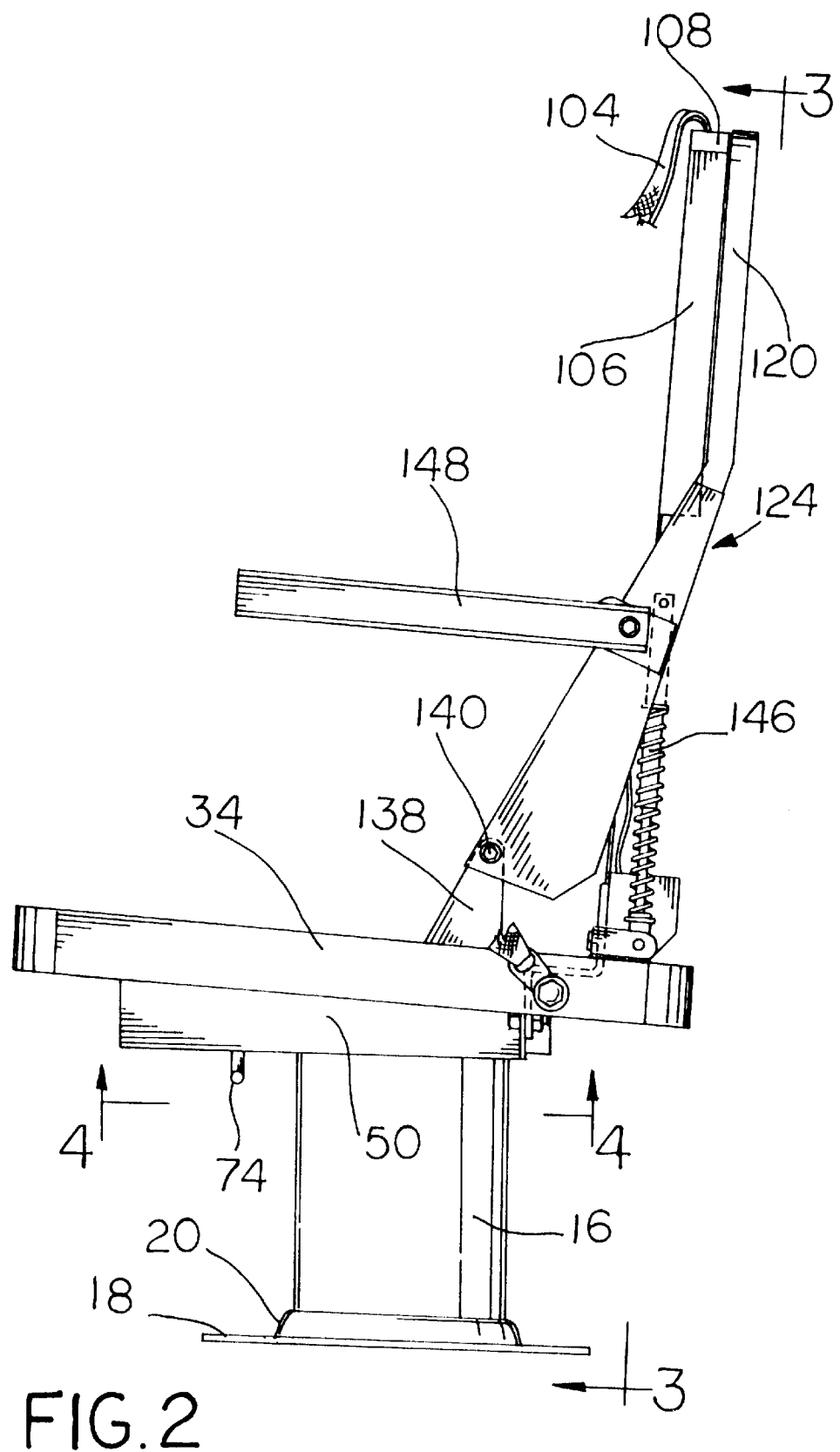
FIG. 2 is a side elevational view of the structure illustrated in FIG. 1.
Figure 3:
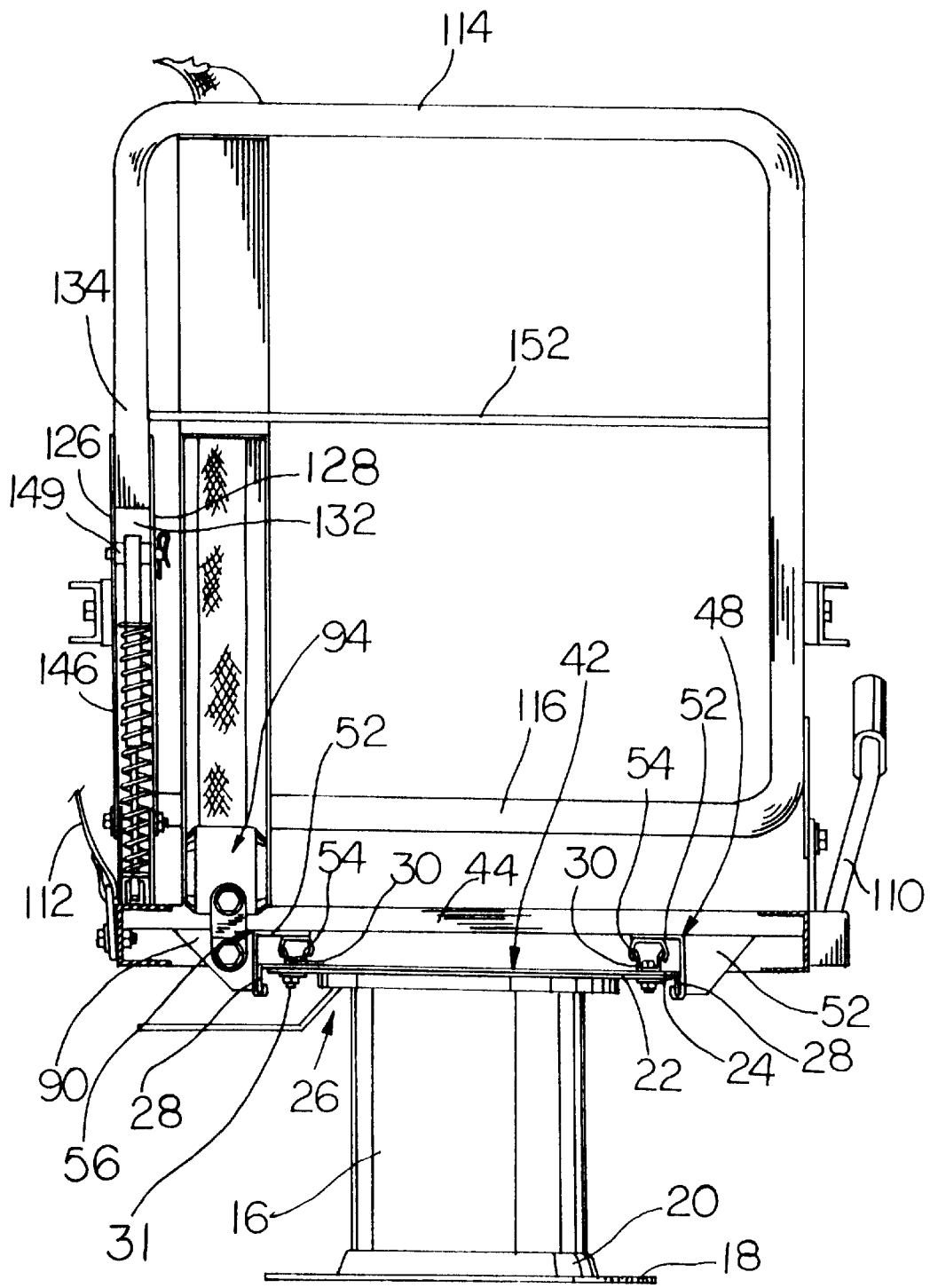
FIG. 3 is a view taken substantially along lines 3—3 of FIG. 2.

Referring now to the drawings, the vehicle seating assembly generally indicated by the numeral 10 includes a back frame member generally indicated by the numeral 12, a seat frame member generally indicated by the numeral 14, and a cylindrical pedestal 16 which supports the frames 12 and 14. The pedestal 16 is secured to a mounting plate 18 which is adapted for connection to the floor of a motor vehicle, such as by bolts (not shown). A reinforcing, semi-circular fillet 20 extends between the cylindrical pedestal 16 and the mounting plate 18. A pair of mounting plates generally indicated by the numeral 22, 24 are mounted on the upper end of pedestal 16 through a rotary connection generally indicated by the numeral 26. Upper mounting plate 24 includes downwardly extending side flanges 28 on opposite sides thereof. A pair of rails 30 are mounted on the upper mounting plate 24. The rails 30 and the mounting plate 22, 24 are held together by bolts 31.

The seat frame member 14 includes a pair of side frame members 32, 34 and a pair of end frame members 36, 38 which interconnect opposite ends of the side frame members 32, 34. Spring wires, indicated at 40, interconnect the side frame members 32 and 34 to support padding and upholstery. In the drawings, the spring wires 40 are cut away to reveal a support assembly generally indicated by the numeral 42 which supports the seat frame number 14 on the pedestal 16.

The support of assembly 42 includes a pair of cross braces 44, 46 that extend between the side frame members 32, 34. A pair of flanged members generally indicated by the numerals 48 and 50 are mounted on the cross members 44, 46 and extend there between substantially parallel to the side frame members 32, 34. Each of the flanged members 48, 50 include a substantially horizontal surface 52 that carries a rail member 54 which slidably engages a corresponding one of the rails 30. The flanged members 48, 50 also include a substantially vertical portion 56, which terminate in a turned over portion 58 that wraps around the flanges 28 and mounting plate 24. Accordingly, the support assembly 42 mounts the seat frame member 14 for sliding movement relative to the pedestal 16, but the rails 30, 54 and the wrapped over portions 58 engaging flanges 28 prevent tilting movement relative to the pedestal, prevent the rails 30, 54 from becoming disengaged due to the load exerted on frame members 12, 14 by the shoulder harness of the seat belt assembly acting through a bracket mounted on the back frame member 14 (as will hereinafter be explained) and restrict rattling and vibration between the component parts. Once moved to a desired position, the seat frame member 34 is locked into place by conventional pivoting locking arms 60, which are operated by a lever 62. The arms 60, the manner in which they lock the seat assembly in place against movement relative to the pedestal 16, and the operation of the lever 62 permits relative sliding fore and aft movement are well known to those skilled in art and will not be explained in detail herein.

Figure 4:
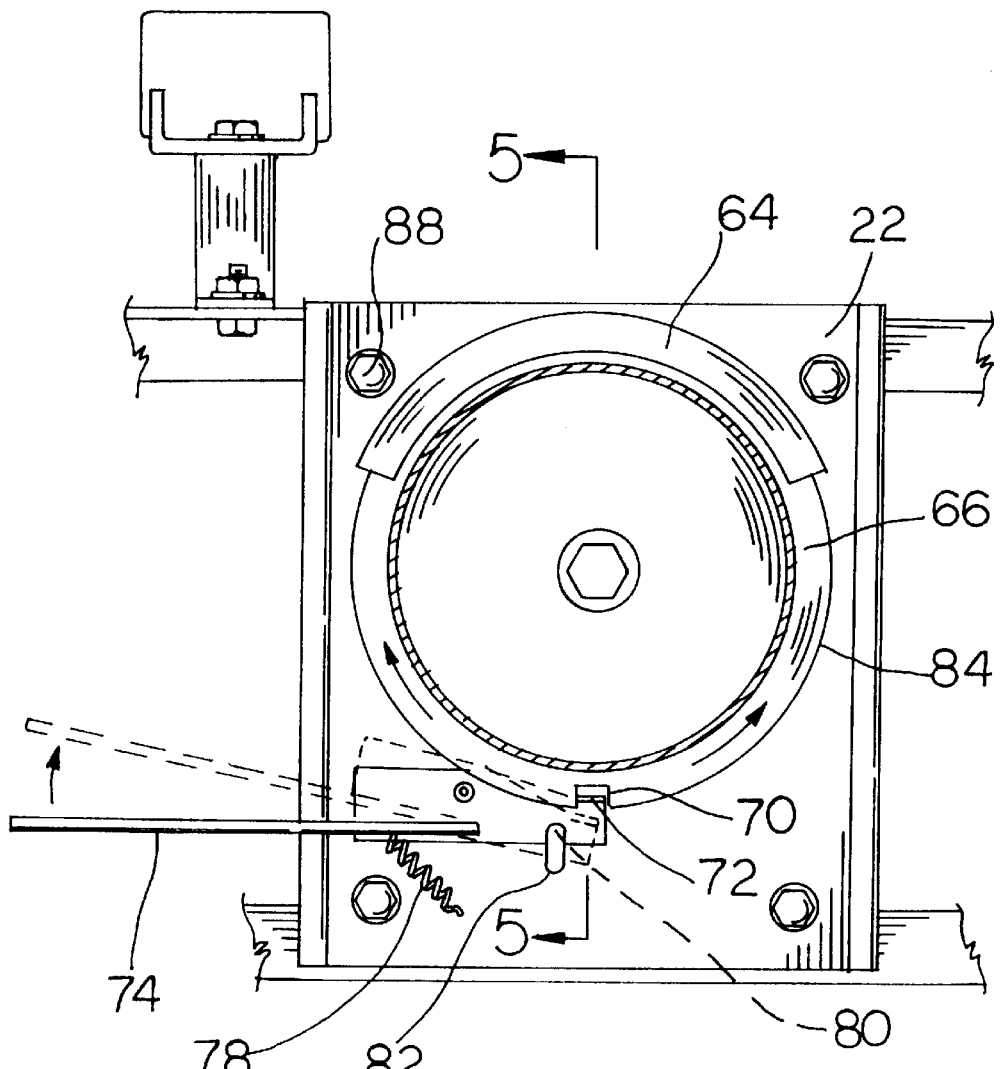
FIG. 4 is a view taken substantially along lines 4—4 of FIG. 2.
Figure 5:
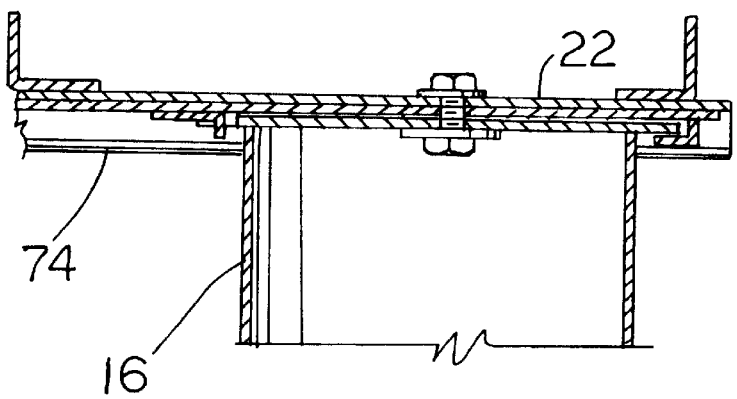
FIG. 5 is a view taken substantially along lines 5—5 of FIG. 4.
Figure 6:
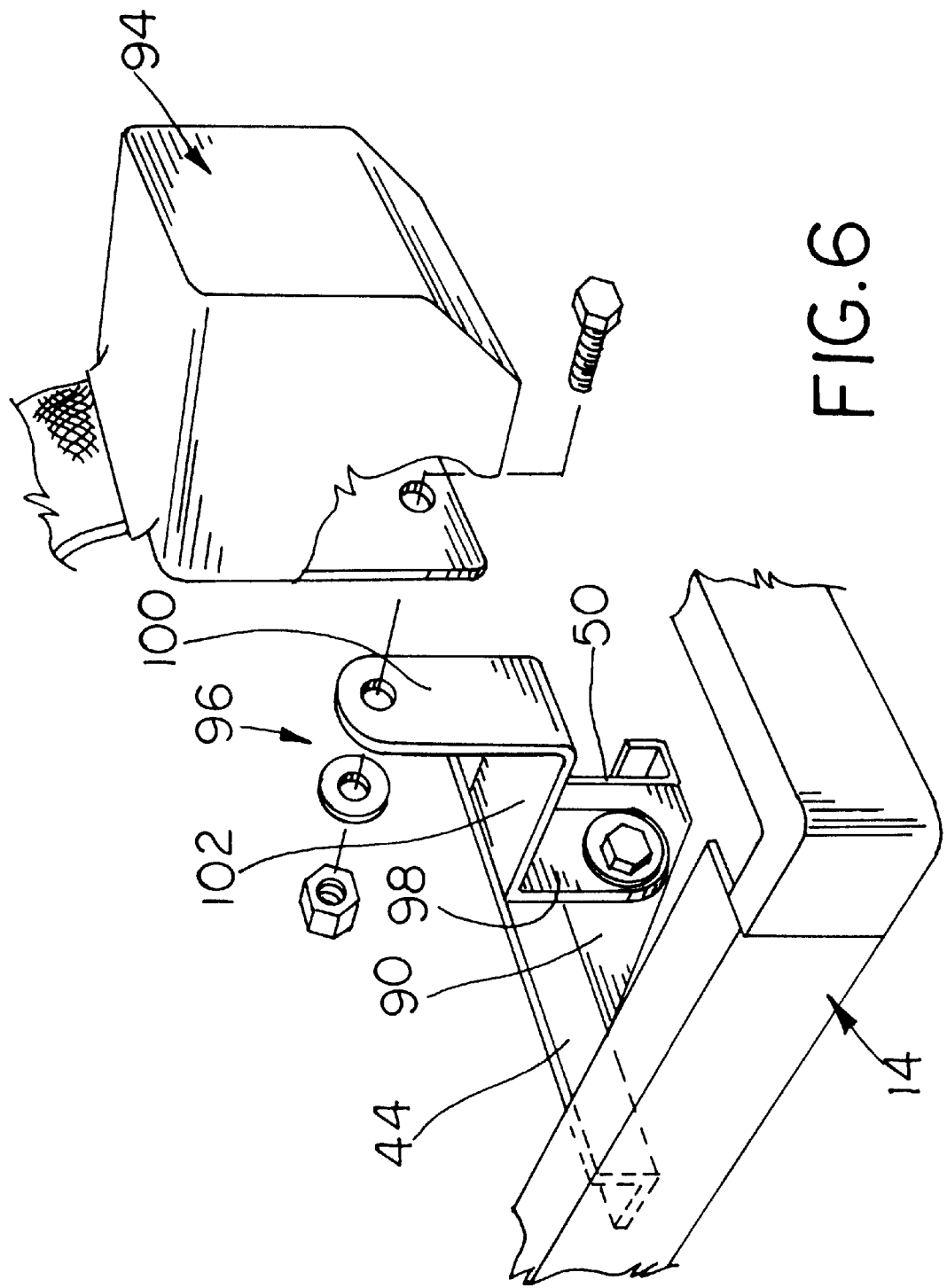
FIG. 6 is an exploded view illustrating the matter of which the seat belt retractor is attached to the frame assembly illustrated in FIGS. 1–3.
Figure 7:
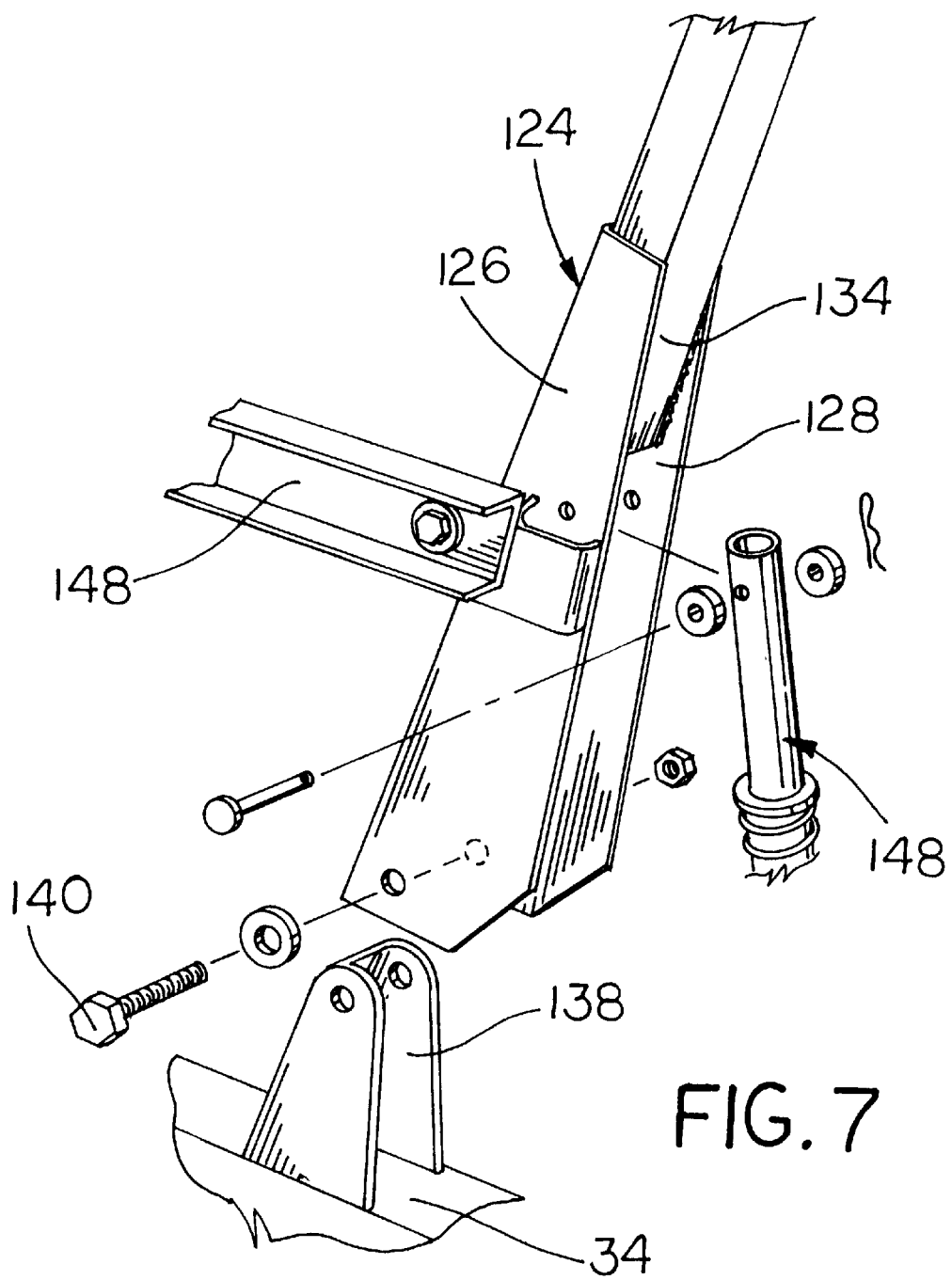
FIG. 7, is an exploded detail view illustrating the channel section of the back frame member and the manner in which it is secured to the tubular portion of the back frame member and the extension from the seat frame member.

Referring now to FIGS. 4 and 5, the rotary connection 26 includes an arcuate member 64 which is secured to the mounting plate 22 in a position where it partially circumscribes the pedestal 16. The pedestal 16 includes a, radially outwardly projecting flange 66, which is received in a groove 68 defined between the arcuate member 64 and the mounting plate 22. A notch 70 is provided in the flange 66 in a portion thereof which is not encompassed be; the arcuate member 64. The notch 70 receives a detent portion 72 of a lever arm 74 which is pivotally mounted on the support plate 22 at a pivot 76. A spring 78 urges the lever 74 about the pivot 76 in a direction urging the detent 72 against the outer periphery of the flange 66 and into the notch 70 when the detent 72 is aligned with the notch 70. A pin 80 extends vertically from the lever 74 into a slot 82 extending through the plates 22, 24. Accordingly, when the detent 72 is engaged with slot 70, relative rotation of the frame 14 relative to the pedestal 16 is prevented. However, upon operation of the lever 74 to withdraw the detent 72 from the slot 70, the frame 14 is allowed to pivot relative to the pedestal 16. The slot 82 is of a length only sufficient to allow the detent 72 so that the detent remains slidably engaged with the outer circumferential surface 84 of the flange 66 after the detent is withdrawn from the notch 70. Accordingly, engagement of the detente 72 with the surface 84 prevents flange 66 from withdrawing from the groove 68. The bolt 86 secures the plates 22 and 24 together, and the bolts 88 secure the rails 54 to the plates 22 and 24.

The support assembly 42 is further reinforced by a pair of gusset plates 90, 92 which are connected between each of the flanged members 48, 50 and the cross member 44. A conventional seat belt retractor assembly 94 is secured to the gusset plate 90 through a bracket generally indicated by the numeral 96. Bracket 96 includes a tab 98 which is attached to the gusset plate 90, a tab 100 which is attached to the seat belt retractor 94, and a transverse portion 102 which extends between the tabs 98, 100 to thereby mount the seat belt retractor 94 in a position just below the back frame member 12 and between the back frame member 12 and the end frame member 36 of seat frame member 14. Accordingly, the seat belt retractor 94 is mounted in the preferred position just behind the seat back frame member 12, so that the substantial forces that are transmitted to the seat belt retractor are transmitted directly through the pedestal 16 without being first transmitted through one of the frame members 12 or 14. The web 104 of the seat, belt is fed from the seat belt retractor 94 upwardly through a sheath 106 and a bracket 108 in a conventional manner. Conventional seat belt mounts 110 and 12 are also provided.

The seat frame member 12 includes a continuous tubular member bent to form opposite end frame members 114, 116 interconnected by a side frame member 118 and including a tubular portion 120 of a side frame member 122. Side frame member 122 also includes a channel section generally indicated by the numeral 124 consisting of side flanges 126, 128 interconnected by a web 130. The inner surfaces of the flanges 126, 128 and the web 130 cooperate to define a gap 132 which receives in portion 134 of tubular portion 120, which is secured to the channel member 124 as by welding. Similarly, the end frame member 116 terminates in a transverse surface at 136 which is secured as by welding to the outer surface of the side flange 126. Seat frame member 14 includes an upwardly projecting portion 138 that is received within the gap 132 and secured to channel section 124 by a pivot connection 140. Accordingly, it will be noticed that the side flanges 126, 128 taper outwardly from the web 130 so that the gap at the end of the channel section 124 receiving end portion 134 is a minimum depth, while the depth of the gap at the opposite end of the channel section 124 is at a maximum depth. Accordingly, the projecting portion 138 and the face 136 of member 116 are secured to the channel section 124 adjacent the end where the depth of the gap is a maximum. A bracket 142 s secured to side frame member 118 is attached to a upwardly extending projection 144 which extends upwardly from side frame member 32 through a pivot connection 146. Accordingly, the seat back frame 12 may be pivoted for that with respect to the seat frame member. A linear locking recliner spring assembly generally indicated by the numeral 146 is mounted substantially vertically between a bracket 147 on frame member 34 and a pin 149 on channel section 124. The recliner spring 146 is conventional, and biases the back frame member 12 to a predetermined position relative to the seat frame member 14.

It will be noted that the channel section 124, because if its side flanges and web, substantially rigidities the back frame member 12, and creates a three point strength support triangle between pivot point 140, the attachment point, provided by pin 149 and the attachment point provided between bracket 147 and recliner spring assembly 146. This design triangle allows the loads from the upper seat belt to be spread among these points. The channel section 124 provides a first connection point of end portion 134, a second connection point with transverse face 136 with end frame member 116. Accordingly, all of the stresses applied to the back frame member 12 are also resisted by the channel section 124, thereby rigidifying the back frame member 12. A conventional arm frame member 148 is pivotally attached to the channel section 124, and an other arm frame member 150 is attached to side frame member 118. A cross member 152 extends between the side frame members 118, 120 to which webbing 154 is attached. Webbing 154 is also attached to the end frame members 114, 116, but these attachments are not shown for clarity.

I claim:

1. Vehicle seating assembly comprising a seat frame member supporting a back frame member, said back frame member including a pair of opposite side frame members and a pair of opposite end frame members interconnecting said side frame members, one of said side frame members including a channel section and a locking recliner spring connected between the channel section and the seat frame member, said seat frame member including a pair of opposite side frame members, a pair of opposite end frame members, and a support assembly supporting said seat frame member, means mounting said back frame member on said seat frame member between said support assembly and one of said end frame members, a seat belt retractor, a bracket securing said seat belt retractor to said support assembly, said seat frame member being supported on a pedestal by said support assembly, said support assembly including a cross frame member and rails extending transverse to said cross frame member supported by said pedestal, and a gusset plate between one of said rails and said cross frame member, said bracket being secured to said gusset plate.

2. Vehicle seating assembly as claimed in claim 1, wherein said bracket supports said seat belt retractor between the seat frame member and the one end frame member.

3. Vehicle seating assembly as claimed in claim 1, wherein said bracket includes a pair of tabs, one of said tabs being secured to said support assembly, the other tab being secured to said seat belt retractor, and a transverse portion extending between said tabs.

4. Vehicle seating assembly comprising a seat frame member having a front and a back end supporting a back frame member adjacent said back end, said back frame member including a pair of opposite side frame members and a pair of opposite end frame member interconnecting said side frame members, one of said side frame members including a channel section, a locking recliner spring, said locking spring including a pair of opposite ends, one end being connected to said channel section by a first pivot, the opposite end of said recliner spring being connected to said seat frame member by a second pivot fixed against movement relative to said seat frame member, a third pivot connecting said channel member to said seat frame member at a point between said second pivot and said front of the seat member, a seat belt retractor mounted on a support assembly supporting said seat frame member for retracting a seat belt, said seat belt extending from said retractor to a bracket mounted on said back frame member, said locking recliner spring, said channel member, and a portion of the seat frame between said second and third pivots defining a three point strength support triangle resisting loads applied by the seat belt through said bracket to said seat back.

5. Vehicle seating assembly as claimed in claim 4, wherein said channel section include a pair of side flange and a web connecting the side flanges, said side flanges cooperating with said web to define a gap therebetween receiving an end potion of said frame member, said end member being secure to said channel section.

6. Vehicle claim assembly as claimed in claim 4, wherein said seat frame member includes a portion extending into said channel section, said third pivot connection said portion to said channel section.

7. Vehicle seating assembly as claimed in claim 4, said seat frame member is supported on a pedestal by a support assembly mounted one end of the pedestal, said pedestal being cylindrical, a mounting plate mounted on the other end of the pedestal, and a reinforcing fillet between said mounting plate and said pedestal, said fillet circumscribing said pedestal.

8. Vehicle seating assembly as claimed in claim 4, wherein said seat frame member is supported on a pedestal by a support assembly said support assembly including a rotary connection between the seat frame member and the pedestal, said rotary connection including an arcuate member defining a groove and a flange extending into said groove, and control means for locking and unlocking said rotary connection, said control means including means limiting relative sliding movement between the arcuate member and the flange to a distance that the flange remains captured within the groove.

9. Vehicle seating assembly as claim 8, wherein said control means includes a pivotally mounted lever movable from a locking position engaging a recess in the flange to prevent relative rotation between the flange and said arcuate member to an unlocked position, said lever in said unlocked position slidably engaging said flange to prevent relative sliding movement between the flange and the arcuate member, and stop means for preventing said lever from moving past said unlocked position.

\* \* \* \* \*